United States Patent [19]

Desmond et al.

[11] Patent Number: 4,698,785
[45] Date of Patent: Oct. 6, 1987

[54] METHOD AND APPARATUS FOR DETECTING CONTROL SYSTEM DATA PROCESSING ERRORS

[76] Inventors: John P. Desmond, 1954 SE. Quail Cir.; Douglas W. Ford, 283 NE. 34th Pl., both of Hillsboro, Oreg. 97124; Michael E. Fossey, 2320 22nd Ave., Forest Grove, Oreg. 97116; Michael Stanbro, 7850 SW. Hemlock, Tigard, Oreg. 97223; Kenneth A. Zimmerman, 6187 SW. 164th Pl., Beaverton, Oreg. 97007

[21] Appl. No.: 557,631
[22] Filed: Dec. 2, 1983
[51] Int. Cl.⁴ .............................................. G06F 11/16
[52] U.S. Cl. ...................................... 364/900; 371/24; 371/71
[58] Field of Search ... 364/200 MS File, 900 MS File; 371/19, 24, 70, 71, 68

[56] References Cited

U.S. PATENT DOCUMENTS

| 3,688,099 | 8/1972 | Buscher | 371/68 X |
|---|---|---|---|
| 4,030,074 | 6/1977 | Giorcelli | 364/200 |
| 4,096,989 | 6/1978 | Tawfik | 371/68 |
| 4,101,958 | 7/1978 | Patterson et al. | 364/200 |
| 4,130,241 | 12/1978 | Meredith et al. | 371/68 |
| 4,217,486 | 8/1980 | Tawfik et al. | 371/68 |
| 4,270,168 | 5/1981 | Murphy et al. | 364/200 |
| 4,541,066 | 9/1985 | Lewandowski | 371/24 X |

OTHER PUBLICATIONS

Sellers, Jr. et al., "Error Detecting Logic for Digital Computers", 1968, pp. 221-222.

Primary Examiner—Thomas M. Heckler

[57] ABSTRACT

A digital-based control data processing system detects during system operation the occurrence of data processing errors. Data processing accuracy is verified by receiving output information developed from system input information in accordance with a first operational function, computing a derived version of the system input information in accordance with a second operational function, and comparing the derived version of the system input information to the actual system input information to determine whether they differ by a predetermined operational tolerance. This method for verifying processing accuracy is especially advantageous for detecting latent software errors which are unique to a particular computer program. The processing system includes display apparatus which develops from the output information a set of display symbols that convey the information on a monitor screen to the pilot. Assigned to each display symbol is an identifying tag which identifies in real time a display symbol that conveys erroneous information.

27 Claims, 4 Drawing Figures

METHOD AND APPARATUS FOR DETECTING CONTROL SYSTEM DATA PROCESSING ERRORS

BACKGROUND OF THE INVENTION

This invention relates to control systems, and more particularly, a digital control data processing and display method and apparatus which verify data processing accuracy by receiving output information developed from system data input information in accordance with a first operational function, computing a derived version of the control data input information in accordance with a second operational function, and determining whether the difference between the derived version of and the actual input information exceeds a preassigned operational tolerance.

There have been known heretofore methods and apparatus for verifying the operational status of digital control systems designed specifically for flight guidance applications.

In particular, U.S. Pat. No. 4,130,241 of Meredith et al. describes an aircraft control system which comprises at least one computer that includes a redundant pair of digital processing channels. Each channel processor separately computes output information corresponding to a control signal which is compared to and averaged with the control signals developed by the other channel processors. The average signal is transmitted by the computer to actuate the movable aerodynamic control surfaces of the aircraft.

Identical input information is applied to both processors in each computer. In an attempt to detect software processing errors, one of the channel processors is configured to convert the input information into the two's-complement digital word format. Despite this difference in digital word format, the input information is processed by both channel processors in accordance with the same operational function. A disadvantage inherent in the system of Meredith, et al. which employs only one computer is that it is incapable of determining the particular processing channel in which a single mode error occurs and, therefore, must cease operation whenever an error of any type occurs.

U.S. Pat. No. 3,688,099 of Buscher describes an automatic flight control system which includes a redundant pair of digital computers. The operational status of the control system is verified by means of a regimen of tests which are performed in a specified sequence. Each computer develops control signal output information in response to sensor input information in accordance with a known program. The operational integrity of the digital processors in each computer is verified in part by processing a known input in accordance with a known program and comparing the computed output signal to the expected output signal. A computed output signal which differs from the expected output signal indicates that either a software or hardware anomaly exists within that particular computer. The system of Buscher suffers from the disadvantage of requiring the use of an external test signal and a single test program which is used in an attempt to determine the accuracy of all possible operational functions. The system also appears to be ineffective in detecting latent software programming errors in a given operational function program.

U.S. Pat. No. 4,030,074 of Giorcelli describes a system for checking two substantially identical data processors operating in parallel. Each data processor includes a general purpose computer and an associated memory which is interconnected to the memory of the other data processor. The system circuitry monitors and compares the result computed by both data processors after each processing step. If a discrepancy exists, the computers regress to the last step which checked out correctly, recompute the step in which the discrepancy originated, and discontinue the operation of the entire system if the discrepancy appears a second time. This system is also incapable of isolating the data processor which has malfunctioned.

U.S. Pat. No. 4,270,168 of Murphy et al. describes a fail-operational, fail-safe multicomputer control system which incorporates two substantially identical computers operating in parallel. Each computer provides for feedback test comparison between the calculated commands and the actual electrical current or voltage signal to which such commands correspond. An error checking system of this type suffers from the disadvantage of requiring a separate command evaluation standard for each possible control signal to determine whether a processing error has occurred.

U.S. Pat. No. 4,101,958 of Patterson et al. describes a method and an apparatus for effecting redundant control data transfer between computation channels in a digital automatic flight control system. Each one of selected control data is identified by an identifying label or tag which corresponds to the address of the memory location where the datum value is stored. The particular datum value is retrieved by a search of the memory for the desired tag and transferred to the desired system location. The Patterson et al. patent neither teaches nor suggests the use of an identifying tag in connection with error detection or display apparatus of any type.

U.S. Pat. No. 4,217,486 of Tawfik et al. describes a digital flight guidance system comprising a pair of processors which operate in one of three configurations. These configurations include (1) the parallel processing of the same input information and comparing the resultant output information, (2) the redundant processing of critical information in both processors and the processing of noncritical information in only one of the processors, and (3) the processing of all operational functions in a first processor and the performance monitoring of the response of the aircraft with a second processor to detect abnormal operation of the first processor. These three system configurations suffer from the disadvantages of, respectively, not isolating the channel in which an error occurs, not providing redundant checking of all control functions, and not determining the existence of an error until after a control signal has been executed U.S. Pat. No. 4,096,989 of Tawfik describes a monitoring apparatus for redundant control systems of the above-described type of Tawfik et al. This apparatus includes means for preventing the monitoring apparatus from assuming an operational condition which does not respond to a detected control system failure. This system does not contemplate the detection of digital data processing errors.

There also have been known control system apparatus which project a display symbol in the form of a light image that conveys information concerning the status of an operational state of the system. Such display symbols include pointers and other characters whose position on or direction of movement across the display screen conveys to the observer information about a particular operational state.

A prior means for determining whether the display symbol conveys the correct information includes the use of a test program which is executed while the control system is off-line. The test program applies known input information to the data processing apparatus which produces output command information in accordance with a known operational control function. A display symbol generator responds to the output command information by projecting a preassigned pointer symbol at a known location on the display screen. A photodetector positioned at the known location receives the light emitted from the pointer symbol and thereby acknowledges the nominal performance of the control system after a successful execution of the test program.

This method of verifying the operational status of a control data processing and display system is capable of neither verifying the status of the system in real time operation nor providing an adequate test for detecting latent software design defects which arise during the execution of a particular control operational function.

SUMMARY OF THE INVENTION

One of the objects of this invention is to provide a flight-qualified aircraft digital control data processing system which detects during system operation data processing errors within a very stringent failure tolerance.

Another object of this invention is to provide such a system in which there is a high probability that unique latent software design defects associated with the processing of each operational function can be detected in real time prior to the execution of a control maneuver in response to the output information developed in accordance with the operational function.

Another object of this invention is to provide such a system which verifies data processing accuracy by receiving output information developed from control data input information in accordance with a first operational function, computing a derived version of the control data input information in accordance with a second operational function, and comparing the derived version of the input information to the actual input information to determine whether digital data processing errors exist.

Another object of this invention is to provide a flight control system which employs a redundant pair of such control data processing systems so that the particular processing system in which a single mode failure occurs can be identified.

Another object of this invention is to provide such a system which includes display apparatus that develops display symbols which convey information about particular aircraft flight control operational states and which is capable of determining in real time whether a particular symbol conveys the correct information.

Another object of this invention is to provide such a control data processing and display system which applies an identifying tag to predetermined display information to identify a particular display symbol which conveys erroneous information.

The present invention relates to a control data processing system which comprises a first digital processing means that includes a control law processor which receives input information and processes it in accordance with a first operational function to develop output information. A second digital processing means receives the output information from the first digital processing means and includes a system monitor processor which computes a derived version of the input information in accordance with a second operational function. A comparison means for comparing the actual input information with the derived version of the input information determines whether they differ within a preassigned operational tolerance.

The particular control data processing system herein disclosed by way of example is applicable to an aircraft flight control system which receives and digitally processes input information in accordance with a first operational function to develop information at the output of the control law processor. The input information is obtained from sensors, which measure certain parameters relating to the control of the flight of the aircraft, and aircraft instrumentation. The output information is communicated by the visual display of images to the pilot who responds by operating the appropriate actuating means which position the movable aerodynamic control surfaces that guide the aircraft.

A problem inherent in digital data processing is that latent software design defects which are unique to a particular computer program can exist even in programs or algorithmic implementations included therein which have been carefully examined and debugged. It is desirable, therefore, to verify in real time the integrity of the output information which has been developed by a control law processor in accordance with a critical operational function. Such verification would prevent the operation of a control actuating mechanism by the pilot in response to erroneous information.

In the present invention, verification of the integrity of the output information is accomplished in accordance with a method in either one of two forms. The same principle of verification underlies both forms of the method.

The first form of the method involves the situation in which output information is developed by the control law processor from input information which define elements of an input vector in a linear algebraic system. The output information defines elements of a solution vector so that the first operational function includes a matrix of the transformation of the input vector into the solution vector. A derived version of the input information is obtained by the system monitor processor which multiplies the solution vector by the inverse of the matrix of the transformation, which corresponds to the first operational function executed by the control law processor.

More specifically, the elements $O_1 \ldots O_n$ of the solution vector are developed by matrix multiplication of the elements $I_1 \ldots I_n$ of the input vector by the elements $A_{11} \ldots A_{nn}$ of the matrix of the transformation which are specified by the first operational function and stored within the control law processor program memory. The development of the output information is expressed in linear algebraic form as $$\begin{bmatrix} O_1 \\ \vdots \\ O_n \end{bmatrix} = \begin{bmatrix} A_{11} & \cdots & A_{1n} \\ \vdots & & \vdots \\ A_{n1} & \cdots & A_{nn} \end{bmatrix} \times \begin{bmatrix} I_1 \\ \vdots \\ I_n \end{bmatrix}.$$

This operation is performed by the control law processor.

The computation of the input information elements $I_{1d} \ldots I_{nd}$ of the derived input vector is achieved by matrix multiplication of the elements $O_1 \ldots O_n$ of the solution vector by a second operational function which is the inverse matrix of the transformation of the first operational function. The elements of the inverse matrix of the transformation which are specified by the second operational function are stored within the system monitor processor program memory. The derivation of the input information is expressed in linear algebraic form as $$\begin{bmatrix} I_{1d} \\ \vdots \\ I_{nd} \end{bmatrix} = \begin{bmatrix} A_{11} & \cdots & A_{1n} \\ \vdots & & \vdots \\ A_{n1} & \cdots & A_{nn} \end{bmatrix}^{-1} \times \begin{bmatrix} O_1 \\ \vdots \\ O_n \end{bmatrix}.$$

This operation is performed by the system monitor processor. As will be further hereinafter described, the elements $O_1 \ldots O_n$ of the solution vector need not be transferred direct from the output of the control law processor to the input of the system monitor processor to detect system malfunctions due to software programming errors.

The operation of the control law processor in accordance with the first operational function is verified, therefore, with the use of a second operational function which involves a different computing process from that which developed the output information. The derived version of the input information is compared with the actual input information to determine whether they differ within a preassigned operational tolerance.

The principle underlying the error detection method of the present invention can be stated as follows. There is a virtually nonexistent chance that an error occurring during a digital processing operation which developed erroneous digital data information would be cancelled out during the inverse processing of the erroneous digital data information to derive the correct value of the input information which had been originally processed.

The second form of the method is utilized in situations where it is impractical to employ the algebraic inverse matrix approach to derive the input information. Such situations include the existence of a matrix of the transformation which is not square and the presence of relatively simple mathematical operations comprising the first and second operational functions.

The second form of the method involves verifying the processing accuracy by deriving certain input information from the (1) output information developed by the control law processor and (2) input information which is different from that being derived. For example, a hypothetical output information word $O_1$ is developed from input information words $I_1$ and $I_2$ by the control law processor in accordance with the following expression:

$$O_1 = I_1 \div I_2.$$

The derived version of input information $I_{1d}$ is computed by the system monitor processor from the previously developed output information $O_1$ in accordance with the following expression:

$$I_{1d} = O_1 \times I_2.$$

The derived version of input information $I_{1d}$ is then compared with the actual value of input information $I_1$.

Although certain input information was used in verifying other input information, the above-stated operating principle of the error detection method is not violated since the validity of the output information is verified by using a process which is different from the process that developed the output information. As indicated by the example, the multiplication process was used as the inverse mathmetical function to check a division process.

A redundant pair of control data processing systems, each including a control law processor and a system monitor processor, is required to permit continued operation of the flight control system in the event that one of the processing systems has experienced a single mode failure. A single mode failure, for example, a hardware failure or software error occurring in one processing system, is detected only from within the affected processing system. The error detection operation is separately performed in each processing system and, therefore, allows continued flight control operation by the unaffected processing system.

Redundant processing systems do not, however, permit a flight control system having a common mode error to continue operating. For example, a software programming error occurring in an otherwise operational flight control system is detected in both processing systems as a common mode error. To decrease the likelihood of the occurrence of common mode software errors, each one of the redundant processing systems executes different computer programs, which may include different algorithmic implementations, that solve the same operational function to obtain the same result. Since each processing system verifies its own accuracy independent of the other processing system, the probability of common mode software errors occurring is thereby further diminished.

Another aspect of the present invention is the assignment of a different identifying tag to each one of predetermined output information words which correspond to critical control surface command operations. In a preferred embodiment of the invention, the control law processor functions asynchronously to the system monitor processor. The identifying tag is assigned to and identifies the output information which is developed by the control law processor, conditioned for visual display, and transferred to the system monitor processor. The tag in effect serves to momentarily synchronize the operation of the control law processor and system monitor processor so that output information in error can be identified and acknowledged prior to any responsive action by the pilot to the display thereof.

The verification in real time by the system monitor processor of display information which is accompanied by an identifying tag provides a means of determining immediately whether such display information is correct.

A control data processing system incorporating a system monitor operating as described herein represents a significant advance in the art in that it provides a determination in real time as to whether the output information developed to control an operational state of the system is correct. Although the present invention is adapted for flight control systems incorporating display apparatus to communicate information to the pilot, the processing accuracy verification apparatus and method described herein can be readily adapted for use in automatic flight control systems such as the one described in U.S. Pat. No. 4,101,958 of Patterson et al. For control data processing systems which incorporate a display apparatus, assigning a tag to display information in accordance with the present invention verifies in real time the integrity of the display information projected on the display screen.

With the use of redundant processing systems, the apparatus and method of the present invention can be used to isolate the processing channel in which a single mode failure occurs and allow continued operation of the flight control system as the verification process in the unaffected processing channel continues to function.

Additional objects and advantages of the present invention will be apparent from the following detailed description of a preferred embodiment thereof which proceeds with reference to the accompanying drawings.

DETAILED DESCRIPTION OF PREFERRED EMBODIMENT

General Description of System Operation

Figure 1:
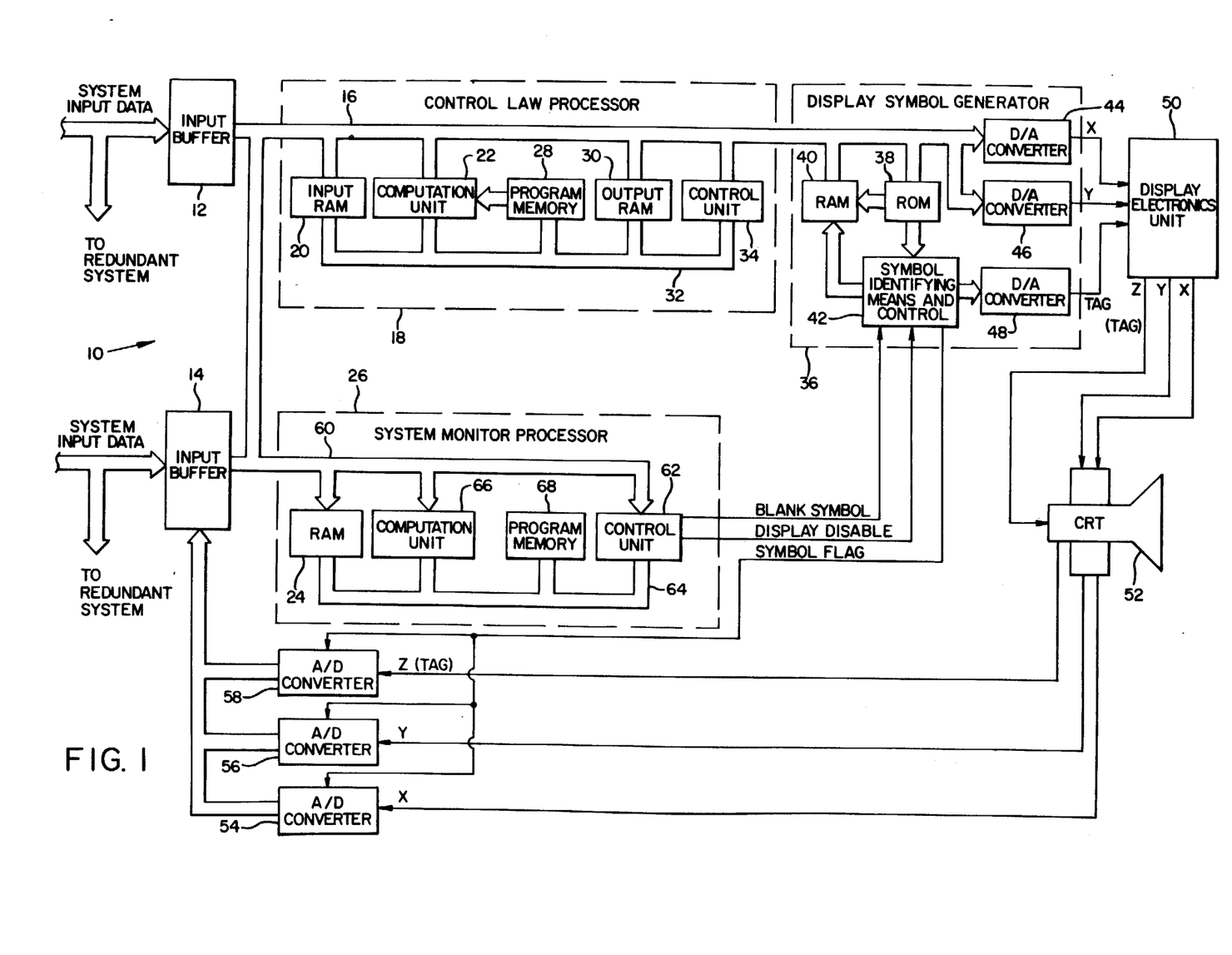
FIG. 1 is a block diagram showing a control data processing system designed to verify in real time its processing accuracy in accordance with the present invention.

FIG. 1 shows a simplified block diagram of a preferred embodiment of control data processing system 10 designed to verify its processing accuracy in accordance with the present invention. Processing system 10 develops information for display to the pilot, and an identical processing system (not shown) operating independent of and asynchronously to processing system 10 develops the same information for display to the copilot. As was indicated hereinabove, a redundant data processing system is employed to provide a flight control system which can continue operating in the event of a single mode failure in one of its processing systems. Whenever a single mode failure occurs, the pilot whose processing system remains operational assumes control of the aircraft. The following description is directed to the operation of processing system 10 and is similarly applicable to that of the redundant processing system.

With reference to FIG. 1, the input buffer circuit 12 stores a first set of sensor and other system input data which are delivered in either analog or digital form to both system 10 and the redundant system for processing. The sensor input data are obtained from signals produced by transducers which indicate the position of the aerodynamic control surfaces; the motions, attitudes, and altitude; and the environmental conditions affecting the flight of the aircraft. The other system input data indicate the operating conditions of the pilot's controls. The analog data are converted into digital word form by analog-to-digital converters included in input buffer circuit 12.

An input buffer circuit 14 stores a second set of sensor and other system input data which correspond to the first set of input data stored in input buffer circuit 12 but are derived from different sources. The analog data are converted into digital form by analog-to-digital converters included in input buffer circuit 14. The first and second sets of system input data are sequentially presented in digital form at the parallel output conductors of the respective input buffer circuits 12 and 14 and then delivered to the data bus 16 of a control law processor 18 in which they are stored in an input random access memory (RAM) 20.

Control law processor 18 is a microprocessor-based digital computer that is dedicated to process the system input data which constitutes its input information and develop output information in accordance with a preprogrammed (hereinafter "first") operational function. The first operational function represents a particular set of mathematical operations which manipulate certain specified input information to develop output information which can be suitably conditioned for communication to the pilot so that he can maneuver the appropriate control mechanisms to guide the aircraft.

The system input data actually employed by control law processor 18 in developing output information are verified as being accurate in accordance with the following procedure. An input datum of one of the sets of system input data and the corresponding input datum of the other set are fetched from RAM 20 and subtracted in computational unit 22 in control law processor 18 to determine whether either input datum is in error. Whenever the difference is less than a predetermined amount, both input data are deemed to be correct. Whenever the difference is greater than a predetermined amount, the input data are deemed to be in error and the operation of the processing system is terminated. When no errors in system input data are detected, the system input data applied to input buffer circuit 12 constitute the actual input information processed by control law processor 18.

The first and second sets of system input data are also delivered to a RAM 24 which is included in the system monitor processor 26. A system input data error detection process analogous to but independent of that performed in control law processor 18 takes place in system monitor processor 26. When no errors in system input data are detected, the system input data applied to input buffer circuit 12 constitute the actual system input data to which the derived versions thereof are compared in system monitor processor 26 as a means for verifying the overall system processing accuracy. If the error detection process in either control law processor 18 or system monitor processor 26 causes an input datum to be misrepresented, the error will be detected by the inverse processing operation of system monitor processor 26.

Selected ones of the input information are retrieved from input RAM 20 during the execution of the first operational function program by control law processor 18. The selection of the input information is dictated by the particular operational function being processed in accordance with the program instructions stored in the program memory 28. The resulting output information developed through the complete execution of the first operational function is a digital word which is presented on data bus 16 at the output of computation unit 22 and is temporarily stored in an output RAM 30. The various data transfer and computational functions performed in control law processor 18 are coordinated by signals applied to a control bus 32 by the control unit 34.

In actual operation, control law processor 18 develops fifteen output information word groups of which each group corresponds to a different display symbol stored in a display symbol generator 36. A display symbol is utilized to convey the output information developed in control law processor 18 and, therefore, provides a visual means for communicating the information contained in the output information words. Each one of the display symbols has a distinctive appearance which is represented by a unique digital word pattern stored in a read only memory (ROM) 38 in display symbol generator 36. The fifteen display symbols represent the totality of information displayed to the pilot for a particular group of system input data.

Control law processor 18 performs fifteen different sets of mathematical operations, i.e., fifteen different first operational functions, to provide a complete set of symbols for the particular group of system input data. If it corresponds to a display symbol which is a vector symbol, i.e., one which conveys information by its distinctive appearance and position on a display monitor screen, the output information developed in control law processor 18 defines in digital word format the horizontal (X) and vertical (Y) position coordinates which specify the location of the display symbol on the screen. The output information also defines the roll angle, i.e., the angular disposition of a vector symbol relative to a reference location on the display. If it corresponds to a display symbol which is an alphanumeric character, the output information developed by control law processor 18 specifies in digital word format the particular character to be displayed. In the case of either vector or alphanumeric symbols, control law processor 18 assembles in a group for each symbol the necessary instruction information for delivery to display symbol generator 36 to effect the correct display of the proper symbol. The fifteen output information word groups are developed in sequence in control law processor 18 and are transferred together from output RAM 30 to a RAM 40 in display symbol generator 36.

The output information word groups are delivered in a seguence from control law processor 18 and are inscribed in RAM 40. Display symbol generator 36 has stored in ROM 38 the information necessary to identify and create each display symbol. Each display symbol stored in ROM 38 includes symbol descriptor information which comprises a unique bit pattern that defines the profile of the particular display symbol it represents. A unique digital word stored in ROM 38 precedes each one of certain preassigned descriptor information and constitutes an identifying tag which associates the particular descriptor information with the output information of control law processor 18 corresponding to the same display symbol. A CALL SYMBOL instruction included in the information word group and transferred from control law processor 18 for each symbol carries the address of the memory location in which the first word of the display symbol information is stored.

A symbol identifying means and control unit 42 (hereinafter control unit 42) coordinates the readout from RAM 40 of the pertinent information word group and from ROM 38 the correct descriptor information relating to the symbol which is to be processed for display. Whenever a roll angle is specified, control unit 42 performs a rotational transformation through the roll angle of the X and Y position coordinates developed in control law processor 18 into X and Y screen position coordinates. For the purposes of clarity and unless otherwise indicated, references made herein to the X and Y position coordinates relate to the monitor screen location of a symbol having a roll angle of 0°. Control unit 42 extracts the identifying tag information from ROM 38 and delivers it for processing as the position coordinates to which it corresponds are read out of RAM 40 for processing.

After the completion of the transfer of the fifteen output information words from control law processor 18 to display generator 36, the output information word groups corresponding to the first display symbol to be displayed on the monitor screen is read out of RAM 40 and then coupled with its identifying tag. The following discussion is directed to the processing and accuracy verification of the first display symbol.

If it be assumed that the first display symbol is a vector symbol, the output information conveying the X and Y position coordinates of the vector symbol in digital word format is converted to analog signal format by the respective digital-to-analog converters 44 and 46 located in display symbol generator 36. The X and Y position coordinate analog signal voltages serve to position the vector symbol in the proper location on the monitor screen. The identifying tag is also converted from digital form to the analog TAG signal by a third digital-to-analog converter 48 located in display symbol generator 36. The X and Y position coordinate signals and the TAG signal are delivered in analog form from the three outputs of display generator 36 to the inputs of the display electronics unit 50.

Display electronics unit 50 is configured to accomplish the calligraphic display of the vector symbol. Display electronics unit 50 amplifies and conditions the analog signals present on its X and Y input conductors to direct the electron beam of cathode ray tube 52 to the proper location and write the symbol on its display screen.

The X and Y output conductors of display electronics unit 50 are applied to the respective horizontal and vertical deflection members of cathode ray tube 52. The Z output conductor of display electronics unit 50 modulates the electron beam intensity. The Z output conductor is also employed to transmit the TAG signal prior to the application of the voltage signal by display electronics unit 50 which excites the flow of beam electrons in cathode ray tube 52. The X and Y position coordinate analog signal voltages instruct the circuitry in display electronics unit 50 to position the electron beam at an initial location on the display screen of cathode ray tube 52. After the electron beam is initially positioned, display symbol generator 36 unloads in the proper sequence from ROM 38 the data which define the shape of the first display symbol. The data read out of ROM 38 are converted to time-varying analog signals by digital-to-analog converters 44 and 46 and are delivered to the X and Y signal input conductors of display electronics unit 50 which conditions the analog signal voltages to deflect the electron beam so that the appropriate symbol can be drawn calligraphically.

The pilot views the displayed information and responds by maneuvering the appropriate control mechanism accordingly. (The next succeeding execution of the particular first operational function relating to the first display symbol provides by way of a newly positioned first display symbol the updated information concerning the change in the corresponding control parameter due to the pilot's previous responsive action and any other intervening changes in operating conditions.)

Verification of the accuracy of the information conveyed by the first display vector symbol is accomplished by deriving at least some of the actual system input data from the X and Y position coordinate deflection signal voltages applied to cathode ray tube 52.

The X and Y analog signal voltages are coupled from the deflection structures of cathode ray tube 52 and along with the TAG analog signal are directed to the inputs of the respective analog-to-digital converters 54, 56, and 58. Subsequent to the application of the X and Y position coordinate analog signals by display electronics unit 50 but prior to the actual imaging of the vector symbol on the monitor screen, the X, Y, and TAG analog signals coupled from cathode ray tube 52 are delivered to and converted from analog to digital form by analog-to-digital converters 54, 56, and 58 whose outputs are applied to inputs of input buffer circuit 14. The resultant digital words at the outputs of analog-to-digital converters 54 and 56 correspond to the output information word of control law processor 18 relating to the first display symbol, and the digital word at the output of digital-to-analog converter 58 represents its assigned identifying tag.

The process of writing the symbol on the monitor screen commences after the X, Y, and TAG digital words are latched in memory registers located in the output circuitry of the respective digital-to-analog converters 54, 56, and 58. Display electronics unit 50 disables cathode ray tube 52 when the TAG information is issued from display symbol generator 36 for delivery to analog-to-digital converter 58. The outputs of input buffer circuit 14 are available to the data bus 60 of system monitor processor 26 which subsequently provides a command to receive the stored X and Y position coordinates and TAG information as will be further hereinafter described.

System monitor processor 26 is a microprocessor-based digital computer which is dedicated to develop derived versions of at least some of the input information corresponding to the actual system input data utilized in the processing of the first operational function by control law processor 18. System monitor processor 26 is programmed with a set of mathematical operations which constitute a second operational function and perform an inverse process of the first operational function. The inverse processing generally takes on either one of two forms.

Whenever the output information word of control law processor 18 and the corresponding information present at the outputs of analog-to-digital converters 54, 56, and 58 define solution vectors and the actual input information defines an input vector, control law processor 18 has stored in its program memory 28 a program for a first operational function which defines in part a matrix of the transformation of the input vector into the solution vector. Accordingly, system monitor processor 26 has stored in its program memory 68 a program for a second operational function which defines in part the inverse matrix of the aforesaid matrix so that at least some of the input vector information can be derived by matrix multiplication.

Whenever the output information word of control law processor 18 and the corresponding information present at the outputs of analog-to-digital converters 54, 56, and 58 represent the result of certain mathematical operations, system monitor processor 26 has stored in its program memory 68 a program for a second operational function which defines mathematical operations that are different from and in part the inverses of the mathematical operations which developed the output information word of control law processor 18.

System monitor processor 26 operates asynchronously to control law processor 18 and fetches on its own initiative the X and Y position coordinate information stored in the memory register in input buffer circuit 14. Whenever a display symbol is processed by display symbol generator 36 for display on a monitor screen, a SYMBOL FLAG signal is communicated from display generator 36 to the Enable inputs of the output registers in analog-to-digital converters 54, 56, and 58 to indicate that the X and Y position coordinates and TAG analog signal information is available for retrieval. During the course of its programmed operational sequence, control unit 62 issues command signals on control bus 64 to fetch from the output registers of analog-to-digital converters 54, 56, and 58 the X and Y position coordinates, and TAG information and store it in RAM 24. That the input information processed by control law processor 18 corresponds to that which developed the information stored in RAM 24 is ensured with reference to the tag assigned to the corresponding output information of control law processor 18.

System monitor processor 26 executes the second operational function and develops by means of computation unit 66 a derived version of each of certain ones of the actual input information as dictated by the operational function being processed in accordance with the program instructions stored in a program memory 68. The derived versions of the system input data appear on data bus 60 at the output of computation unit 66 and are inscribed in preassigned memory locations in RAM 24.

After completing the processing of the second operational function, system monitor processor 26 performs a comparison between each of preselected ones of the actual system input data words and its corresponding derived version of the system input datum word. Each corresponding pair of input data words is retrieved from RAM 24 and delivered to computation unit 66 which compares them. Whenever each pair of actual and derived system data input words compare, the processing system continues the processing sequence with the start of processing in display symbol generator 36 of the next succeeding, i.e., the second, display symbol. Whenever an error occurs, an error signal is produced at the output of computation unit 66 and is communicated to control unit 62 which responds in either one of two ways. If the symbol has been predesignated in program memory 68 as noncritical, a BLANK SYMBOL signal is sent to control unit 42 to blank only the affected symbol from the monitor screen. If the symbol has been predesignated in program memory 68 as critical, a DISPLAY DISABLE signal is sent to instruct control unit 42 to blank all symbols from the monitor screen.

Whenever a BLANK SYMBOL signal is produced in only one processing system, thereby indicating a single mode failure of a noncritical symbol, the affected display symbol is blanked from the monitor screen and the processing of the next succeeding display symbol commences. The unaffected processing system continues to function. Whenever BLANK SYMBOL signals are produced in both processing systems, thereby indicating a common mode failure of a noncritcal symbol, the affected display symbol is blanked from both monitor screens and processing of the next succeeding display symbol commences in both processing systems.

Whenever a DISPLAY DISABLE signal is produced in only one processing system, thereby indicating a single mode failure of a critical symbol, only the processing system in which the error occurred is rendered inoperative. The unaffected processing system continues to function. Whenever DISPLAY DISABLE signals are produced in both processing systems, thereby indicating a common mode failure of a critical symbol, both processing systems are rendered inoperative.

An alternative means for indicating the occurrence of an error in a noncritical symbol is the display of warning messages or the delivery of a blanking signal through the operation of control law processor 18 upon receipt of the BLANK SYMBOL signal from system monitor processor 26 through the system bus.

The foregoing analysis also applies to the display and accuracy verification of an alphanumeric display symbol. The information stored in ROM 38 defines the seven segments in the standard arrangement for an alphanumeric character. The output information from control law processor 18 conveys the position coordinate information of the segments which are to be calligraphically drawn to produce the desired character. The accuracy verfication process, therefore, checks the correct positioning of the character as well as the display of the actual information it conveys.

The display symbol processing and accuracy verification sequence for each one of the fifteen display symbols is updated twenty times per second. The display image information is refreshed sixty times each second to prevent image flicker.

It will be appreciated by those having ordinary skill in the art that the above-described accuracy verification process completely includes the subsequent conditioning, as well as the actual development, of the output information of control law processor 18. Software or hardware errors occurring in either control law processor 18 or system monitor processor 26, as well as in any one of the processing system elements through which information developed from the input information of control law processor 18 flows, will be detected to a high degree of probability under the accuracy verification method described herein. The assigning of an identifying tag to a display symbol during the course of the execution of the processing and accuracy verification method of the present invention provides a means for ensuring in real time that a display symbol so identified conveys the correct information on the display screen.

It will also be appreciated that the processing and accuracy verification method described herein can be accomplished in a system employing a single computational means which not only develops output information from input information, but also verifies its processing accuracy by computing a derived version of the input information.

Control Data Processing and Accuracy Verification Using Matrix Operations

The following is an example of the control data processing and accuracy verification of a vector symbol in which linear algebraic matrix operations are employed. The specific vector symbol is denominated as the flight path symbol, which indicates the instantaneous direction of the earth frame velocity of an aircraft relative to its longitudinal axis. During an approach of the aircraft to a runway, the flight path symbol indicates on a monitor screen to the pilot where the airplane will impact the ground if all controlling parameters remain constant.

Figure 2:
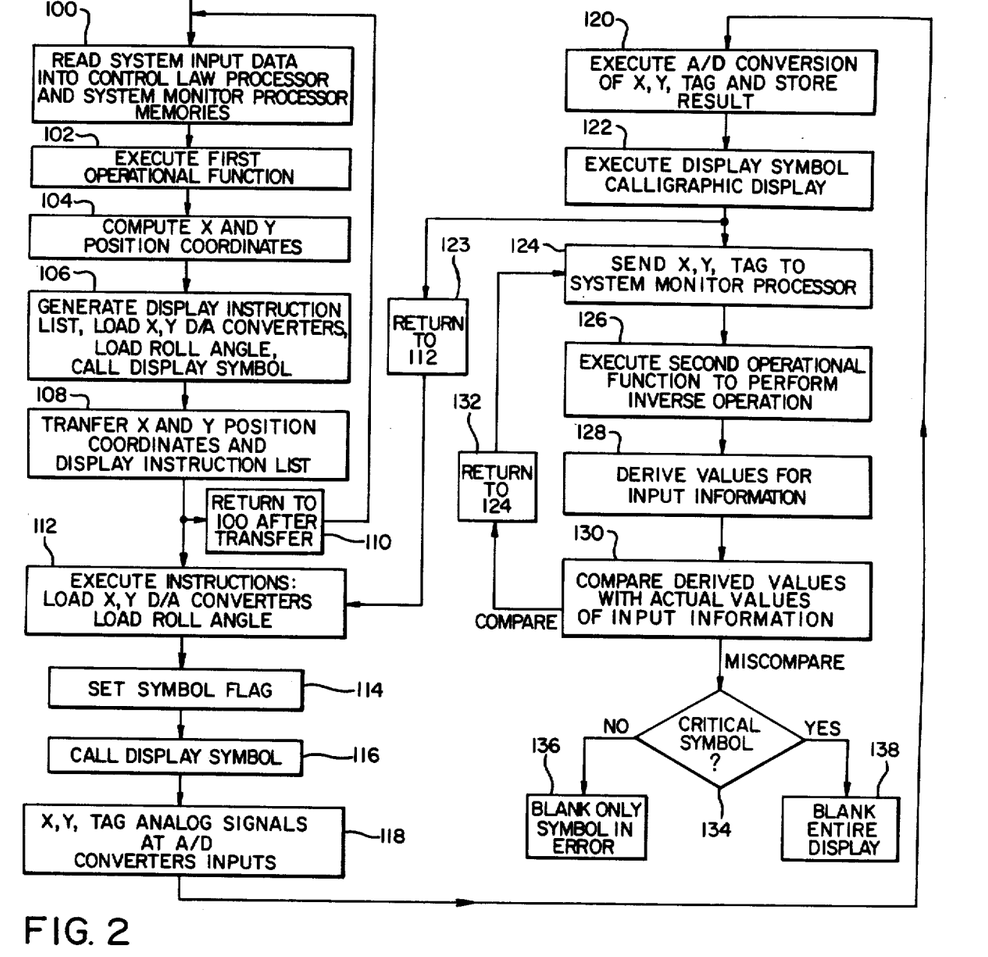
FIG. 2 is a flow diagram of the processing steps of one exemplary display vector symbol in accordance with the present invention.

FIG. 2 is a flow diagram of the processing steps for the development and accuracy verification of the flight path vector symbol as they pertain to the elements of the processing system 10 shown in FIG. 1. With reference to FIG. 2, after power is applied to processing system 10, the first step 100 is the loading into input RAM 20 of control law processor 18 and RAM 24 of system monitor processor 26 the actual system input data which comprises the input information dictated and processed by the first operational function in developing the output information corresponding to the X and Y position coordinates of the flight path symbol. The program instructions which are stored in program memory 28 cause the system input data listed under the Input Information heading in Table I to be fetched during the execution of the program. The designation "IRS" in Table I refers to "inertial reference system."

TABLE I

Input Information

Pitch (IRS)
Roll (IRS)
Magnetic Heading (IRS)
North-South Velocity (IRS) (XDOT)
East-West Velocity (IRS) (YDOT)
Vertical Velocity (IRS) (ZDOT)

Aircraft Body Velocities $U = B_{11} \times XDOT + B_{12} \times YDOT + B_{13} \times ZDOT$
$V = B_{21} \times XDOT + B_{22} \times YDOT + B_{23} \times ZDOT$
$W = B_{31} \times XDOT + B_{32} \times YDOT + B_{33} \times ZDOT$ Euler Rotation Matrix $B_{11} = \cos(Pitch) \times \cos(Heading)$
$B_{12} = \cos(Pitch) \times \sin(Heading)$
$B_{13} = -\sin(Pitch)$
$B_{21} = \sin(Pitch) \times \cos(Heading) \times \sin(Roll) - \cos(Roll) \times \sin(Heading)$
$B_{22} = \cos(Roll) \times \cos(Heading) + \sin(Roll) \times \sin(Pitch) \times \sin(Heading)$
$B_{23} = \sin(Roll) \times \cos(Pitch)$
$B_{31} = \sin(Roll) \times \sin(Heading) + \cos(Roll) \times \sin(Pitch) \times \cos(Heading)$
$B_{32} = \sin(Pitch) \times \sin(Heading) \times \cos(Roll) - \sin(Roll) \times \cos(Heading)$
$B_{33} = \cos(Roll) \times \cos(Pitch)$.

Step 102 involves the execution by control law processor 18 of the algorithms of the first operational function to develop the aircraft body velocities U, V, and W from which the flight path symbol position coordinates are computed. The aircraft body velocities U, V, and W are computed from the input information in accordance with the first operational function as indicated under the Aircraft Body Velocities heading in Table I. The coefficients $B_{11} \ldots B_{33}$ represent the elements of the Euler rotation matrix as defined under the Euler Rotation Matrix heading in Table I. Each one of the Euler rotation matrix coefficients is computed from the input information.

Step 104 involves the use of the computed values of U, V, and W by control law processor 18 to compute the X and Y position coordinates in accordance with the following mathematical expressions:

$$X = \arctan(V/U)$$

$$Y = \arctan(-W/U).$$

Control law processor 18 repeats the preceding steps at this stage of the processing sequence to process different ones of the stored input information to develop X and Y position coordinates for each one of the other fourteen display symbols. The discussion herein is restricted, however, to specifically the processing of the flight path symbol.

The X and Y position coordinates are represented in digital word format and comprise the output information of control law processor 18 relating to the flight path symbol. As indicated in step 106, the output information relating to the flight path symbol is assembled with a list of program instructions for transfer in a specified sequence to display symbol generator 36. The program instructions include:

LOAD X, Y D/A CONVERTERS, which provides for loading the X and Y position coordinates into the respective digital-to-analog converters 44 and 46;

LOAD ROLL ANGLE, which provides for the tilt of the flight path symbol on the display screen in accordance with the Roll input information of the aircraft; and CALL DISPLAY SYMBOL (FLIGHT PATH), which provides for the sequential loading of the information, which is stored in ROM 38 and defines the profile of the symbol, into digital-to-analog converters 44 and 46 to write the symbol on the monitor screen after the symbol has been positioned.

As indicated in step 108, these three instructions as well as the X and Y position coordinates are transferred to and inscribed in RAM 40 of display symbol generator 36. (The program instructions relating to the other fourteen display symbols are also assembled and then transferred to display generator 36 during steps 106 and 108.)

Step 110 indicates that after step 108 has been completed, the steps 100–108 are repeated to select and process the input information corresponding to the next succeeding set of fifteen display symbols as display symbol generator 36 continues the processing of the flight path symbol and the other fourteen display symbols.

Step 112 indicates that the instructions transferred during step 108 and inscribed in RAM 40 are executed by control unit 42. The X and Y position coordinates are fetched from RAM 40 and applied to the inputs of digital-to-analog converters 44 and 46. The X and Y position coordinate analog signal voltages are applied to cathode ray tube 52 at this time. The Roll information for applying the proper tilt angle to the flight path symbol is received in a register in control unit 42.

Step 114 involves the setting of the SYMBOL FLAG in control unit 42 which communicates to analog-to-digital converters 54, 56, and 58 that a display symbol is being processed for display.

Step 116 represents the call from control unit 42 to ROM 38 for the pattern information relating to the flight path symbol. The pattern information is identified in ROM 38 by the identifying tag which is applied to the input of digital-to-analog converter 48. The TAG analog signal voltage is applied to the Z (TAG) output conductor of display electronics unit 50 at this time.

Step 118 indicates that the X, Y, and TAG analog signals are available at the inputs to the respective analog-to-digital converters 54, 56, and 58 prior to the drawing of the flight path symbol on the monitor screen.

Step 120 involves the conversion of the X, Y and TAG signals to digital format by the respective analog-to-digital converters 54, 56, and 58. The X position coordinate, Y position coordinate, and TAG information words are stored in memory registers in the output circuitry of the respective analog-to-digital converters 54, 56 and, 58, the TAG word identifying the display symbol to which the X and Y position coordinate information correspond.

Figure 3:
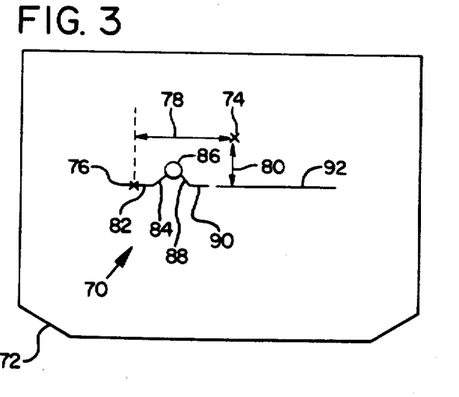
FIG. 3 is a diagrammatic illustration of a display monitor screen showing the position and orientation of a first exemplary display symbol developed in accordance with process set forth in the flow diagram of FIG. 2.

Step 122 represents the execution of the calligraphic display of the flight path symbol in accordance with the pattern information stored in ROM 38 which is read out during this time. FIG. 3 shows the profile of the flight path symbol 70 on a monitor screen 72. The location 74 on the screen is the location from which the screen positions of all display symbols are referenced. Reference location 74 has X and Y reference position coordinates which are characteristic of the display system and are stored in program memories 28 and 68 of control law processor 18 and system monitor processor 26, respectively. The electron beam of cathode ray tube 52 is directed to location 76 upon the application of the X and Y position coordinate analog signal voltages. Dimension lines 78 and 80 represent the respective X and Y displacements of the electron beam from reference location 74 to location 76.

Step 122 entails the calligraphic synthesis of flight path symbol 70 from the initial point of location 76. The pattern information read out of ROM 38 produces a piecewise construction of the symbol. Horizontal straight-line segment 82, upwardly sloping straight-line segement 84, circular segment 86, downwardly sloping straight-line segment 88, and horizontal straight-line segment 90 are drawn as indicated in FIG. 3 in the order of ascending reference numerals. There is no roll angle associated with flight path vector symbol 70 whose segments 82 and 90 are aligned with horizontal reference line 92 as shown.

Step 123 indicates that after the calligraphic display of the symbol has been completed, the processing sequence repeats steps 112–122 to prepare the next succeeding symbol for display. During this time, accuracy verification processing of the display symbol proceeds in step 124 asynchronously in accordance with the operation of system monitor processor 26.

Step 124 involves the fetching from the memory registers located in the output circuitry of analog-to-digital converters 54, 56, and 58 and the inscription in RAM 24 of the X, Y, and TAG words. The X and Y position coordinates obtained in step 124 correspond to the X and Y position coordinates previously transferred to display symbol generator 36 in step 108. The X and Y position coordinates of step 124 form the basis for the accuracy verfication computation by system monitor processor 26. The actual system input data information employed by control law processor 18 to compute the X and Y words were previously inscribed in RAM 24. The processing of step 124 is initiated and coordinated by control unit 62 in accordance with the program stored program memory 68.

Step 126 indicates the mathematical computation by system monitor processor 26 on the data it received. System monitor processor 26 verifies the system processing accuracy by computing the parameters U', V', and W' in accordance with the following mathematical expressions:

$$U' = 1$$

$$V' = \tan(X \text{ Position Coordinate} - \text{Reference } X \text{ Position Coordinate}) \times K_3$$

$$W' = -\tan(Y \text{ Position Coordinate} - \text{Reference } Y \text{ Position Coordinate}) \times K_3$$

The X and Y position coordinates are the values obtained in step 124. The constant $K_3$ is a scale factor stored in program memory 68 to eliminate the scaling introduced, for example, by the amplifiers in display electronics unit 50.

Step 128 indicates the computation of the ground frame velocities XDOT, YDOT, and ZDOT. This is accomplished by rotating the body axis velocities U', V', and W' through the Euler inverse matrix in accordance with the following mathematical expressions:

$$\text{XDOT(derived)} = (B_{11} \times U' + B_{21} \times V' + B_{31} \times W') \times U$$

$$\text{YDOT(derived)} = (B_{12} \times U' + B_{22} \times V' + B_{32} \times W') \times U$$

$$\text{ZDOT(derived)} = (B_{13} \times U' + B_{23} \times V' + B_{33} \times W') \times U$$

The Euler coefficients $B_{11} \ldots B_{33}$ are the same as those defined in Table I.

It will be appreciated that the derived values for XDOT, YDOT, and ZDOT comprise three quantities of the input information of control law processor 18.

Step 130 entails the comparison in computation unit 66 of the derived version of each input datum with its corresponding actual input datum to determine whether they differ by a preassigned operational tolerance which is dictated by a constant stored in program memory 68.

If the actual and derived versions of each input datum compare, step 132 specifies the return to step 124 to verify the processing accuracy of the next succeeding display symbol. If any one pair of actual and derived versions of an input datum miscompares, step 134 is a check to determine whether the affected symbol is critical. If the symbol is noncritical, step 136 specifies that only the symbol in error be blanked from the monitor display. If the symbol is critical, step 138 specifies that all symbols be blanked from the display.

It will be appreciated that in the case of the flight path symbol, only three system input data are derived to verify the accuracy of a processing system. It is apparent, however, that additional computations can be executed if it be deemed desirable to further verify the system processing accuracy.

Control Data Processing and Accuracy Verification Using Different Mathematical Operations The following is an example of control data processing of a vector symbol in accordance with certain mathematical operations and the subsequent processing accuracy verification in accordance with different mathematical operations. The specific vector symbol is denominated as the localizer vector symbol, which indicates the lateral angle deviation of the aircraft from an internally generated reference. The localizer symbol provides course guidance to the runway. The processing and accuracy verification steps are performed in a manner analogous to that described for the flight path symbol. In this example only the actual input information, first and second operational functions, and derived input information are defined.

The system input data comprises four sensor inputs and two other data inputs which are listed under the Information Word heading in Table II.

TABLE II

| Information Word |
|---|
| Magnetic Heading (IRS) |
| Roll (IRS) |
| Localizer Deviation |
| Glideslope Reference Y Position |
| Selected Course Mark X Position |

The Glideslope Reference Y Position and the Selected Course Mark X Position are data obtained from aircraft instrumentation.

The X and Y position coordinates for the localizer symbol are determined in accordance with the first operational function as represented by the following equations:

$$X_1 = K_6 \times (\text{Selected Course Mark } X \text{ Position} - \text{Magnetic Heading} + \text{Localizer Deviation}).$$

where $K_6$ is a positioning scale factor equal to six.

$Y_1 = $ Glideslope Reference Y Position.

Figure 4:
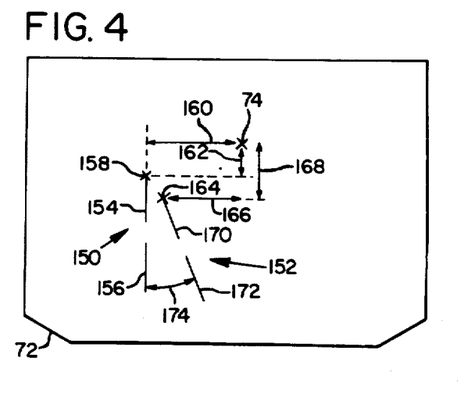
FIG. 4 is a diagrammatic illustration of two representations of a second exemplary display symbol developed at different times and superimposed on a monitor screen to demonstrate the effect of a roll angle on the position and orientation of a vector display symbol.

The $X_1$ and $Y_1$ values are developed in control law processor 18 from the input information by means of the above-indicated simple arithmetic operations to position the localizer symbol in the proper location on the display screen. The values of $X_1$ and $Y_1$ are transformed into the actual localizer X and Y position coordinates on the screen by the operation of control unit 42 in display symbol generator 36. This is accomplished in accordance with the conventional equations for rotation of a point in a coordinate system through the angle specified by the Roll input information. FIG. 4 shows superimposed localizer symbols 150 and 152 on screen 72 to indicate the effect of the Roll input datum on the position coordinates and display of a vector symbol.

Whenever the Roll input information specifies a roll angle of 0°, localizer symbol 150 appears on monitor screen 72 as a pair of vertically disposed spaced-apart straight-line segments 154 and 156 in end-to-end alignment. The X and Y position coordinate analog signal voltages direct the electron beam to location 158 to write the symbol. Dimension lines 160 and 162 represent the respective X and Y displacements of the electron beam from reference location 74 to location 158. The pattern information read out of ROM 38 produces the piecewise construction of localizer symbol 150 in a manner analogous to that described above for the flight path symbol.

Whenever the Roll input information specifies a roll angle of 30°, localizer symbol 152 is positioned on the screen as shown in FIG. 4 in the following manner. A roll angle is generated from the boresight reference which is a known reference location stored in the program memories 28 and 68 of the respective control law processor 18 and system monitor processor 26. The boresight reference is represented as location 74 in FIGS. 3 and 4. Control law processor 18 receives the Roll input datum, computes the $X_1$ and $Y_1$ values in accordance with the mathematical expressions set forth hereinabove, and transforms these coordinates using the conventional equations for rotation of a point about an origin, which is the boresight reference location 74. The Roll input datum specifies the angle of rotation. The resultant set of X and Y position coordinates correspond to location 164 from which localizer symbol 152 is drawn. Since localizer symbol 152 is rotated relative to the boresight reference location 74 which is not coincident with location 158 of localizer symbol 150, the starting location 164 from which localizer symbol 152 is drawn is different from location 158 of the vertically disposed localizer symbol 150. Dimension lines 166 and 168 represent the respective X and Y displacements of the electron beam from boresight reference location 74 to location 164.

Display symbol generator 36 receives the Roll angle instruction from control law processor 18 and by means of control unit 42 conditions the symbol descriptor information stored in ROM 38 to provide information to direct the electron beam to write straight-line segments 170 and 172 as indicated in FIG. 4. The tilt angle 174 of 30° shows the slant provided to localizer symbol 152 relative to localizer symbol 150 as dictated by the Roll input information.

Since control law processor 18 computes the display symbol position coordinates and display symbol generator 36 transforms them with reference to the Roll input information, the processing accuracy verification method of the present invention determines whether a roll angle resolved vector display symbol has the correct position and orientation on monitor screen 72.

The localizer symbol X and Y position coordinates which are subsequently conditioned and fetched by system monitor processor 26 are processed in accordance with the second operational function. The Localizer Deviation sensor input information is the only quantity derived to verify the processing accuracy and is obtained as follows.

The localizer position coordinates are measured from the reference location 74 in FIG. 3 which is the same as that for the flight path symbol. The differences as respects each dimension between the two locations on the display screen are expressed as:

$X_0 = $ (X Position Coordinate $-$ X Reference Position Coordinate)

$Y_0 = $ (Y Position Coordinate $-$ Y Reference Position Coordinate)

The X position coordinate and Y position coordinate represent the digital words present at the outputs of the respective analog-to-digital converters 54 and 56.

System monitor processor 26 derives the Localizer Deviation input in accordance with the second operational function as represented by the following equation:

Localizer Deviation(derived) = $SQRT(X_0^2 + Y_0^2) \cdot SIGN(X_0) \times K_4$.

where $K_4$ is a stored scaling factor.

The nomenclature SQRT represents the square root, which is a nonlinear mathematical operation, and the nomenclature SIGN represents a change of sign operation. As indicated, system monitor processor 26 performs a squaring function on both the $X_0$ and $Y_0$ values to obtain the derived version of Localizer Deviation sensor input information.

The derived value of the Localizer Deviation is compared with the actual Localizer Deviation sensor input datum to determined whether they differ within a preassigned operational tolerance which is dictated by a constant stored in program memory 68.

The response of the processing system to a comparison or miscomparison is the same as that described for the flight path symbol.

The use of mathematical operations in system monitor processor 26 which are different from those performed in control law processor 18 to obtain the derived Localizer Deviation sensor input verifies the accuracy of the processing system and ensures to a high degree of probability that no latent software errors occurred.

It will be obvious to those having skill in the art that many changes may be made in the above-described details of the preferred embodiment of the present invention. The scope of the present invention, therefore, should be determined only by the following claims.

What is claimed is:

1. An information processing system, comprising:
   first digital processing means for receiving input information and for processing the input information in accordance with a first operational function to develop output information, the first operational function being implemented in a first of information processing algorithms;
   second digital means receiving the output information from thefirst digital processing means for computing a derived version of the input information in accordance with a second operational function, the second operational function being implemented in a second set of information processing algorithms which differs from the first set of information processing algorithms; and
   comparison means for comparing the actual input information with the drived version of the input information to determine whether they differ within a preassigned operational tolerance.

2. The system of claim 1 in which the second operatonal function corresponds to an inverse function of the first operational function.

3. The system of claim 1 in which the first digital processing means comprises:
   digital computing means for developing the output information and representing the output information in a first format;
   conditioning means for receiving the output information represented in the first format and representing the output information in a second format; and
   the second processing means receiving the information represented in the second format as a parameter in computing the derived version of the input information.

4. The system in claim 3 which further comprises identifying means in communication with the conditioning means, the identifying means assigning to a predetermined one of the output information an identifying tag which is utilized by the second processing means to identify the predetermined one of the output information which figures in a difference computation that is not within the preassigned operational tolerance.

5. The system of claim 1 in which the input information defines elements of an input vector and the output information defines elements of a solution vector so that the first operational function includes a matrix of the transformation of the input vector into the solution vector, the second operational function including the inverse matrix of the matrix of the transformation.

6. An information processing system, comprising:
first digital processing means for receiving input information and for processing the input information in accordance with a first operational function to develop output information, the first digital processing means including identifying means for assigning an identifying tag to at least one of the output information;
second digital processing means for computing in accordance with a second operational function a derived version of the input information, the second digital processing means operating asynchronously to the first digital processing means and communicating with the first digital processing means to receive information corresponding to the output information and identified by the identifying tag; and
comparison means for comparing the actual input information with the derived version of the input information to determine whether they differ by more than a preassigned operational tolerance.

7. An information processing system, comprising:
first digital processing means for receiving input information and for processing the input information in accordance with a first operational function to develop output information, the first digital processing means including digital computing means for developing the output information and representing it in a first format and including conditioning means for receiving the output information represented in the first format and for representing it in a second format;
second digital processing means for receiving from the first digital processing means the output information represented in the second format and for using the output information represented in the second format as a parameter in computing a derived version of the input information in accordance with a second operational function; and
comparison means for comparing the actual input information with the derived version of the input information to determine whether they differ within a preassigned operational tolerance.

8. The system of claim 7 which further comprises identifying means in communication with the conditioning means, the identifying means assigning to a predetermined one of the output information an identifying tag which is utilized by the second processing means to identify the predetermined one of the output information which figures in a difference computation that is not within the preassigned operational tolerance.

9. An information processing system, comprising:
first digital processing means for receiving input information and for processing the input information in accordance with a first operational function to develop output information, the input information defining elements of an input vector and the output information defining elements of a solution vector so that the first operational function includes a matrix of the transformation of the input vector into the solution vector;
second digital processing means receiving information from the first digital processing means for computing a derived version of the input information in accordance with a second operational function, the second operational function including the inverse matrix of the matrix of the transformation; and
comparison means for comparing the actual input information with the derived version of the input information to determine whether they differ within a preassigned operational tolerance.

10. An aircraft control system, comprising:
plural control mechanisms by which a pilot can control the flight of an aircraft;
sensing means for sensing and for providing input informatin relating to the operational status of the control mechanisms;
first digital processing means for processing the input information in accordance with a first operational function to develop output information, the first operational function being implemented in a first set of information processing algorithms;
second digital processing means receiving the output information from the first digital processing means for computing a derived version of the input information in accordance with a second operational function, the second operatonal function being implemented in a second set of information processing algorithms which differs from the first set of information processing algorithms;
comparison means for comparing the actual input information with the derived version of the input information to determine whether they differ within a preassigned operational tolerance;
first means for communicating to the pilot information corresponding to the output information to assist the pilot to manipulate at least some of the control mechanisms to control the flight of the aircraft; and
second means for communicating to the pilot a message whenever the comparison means determines that the actual input information and the derived version of the input information are not within the preassigned operational tolerance, thereby to inform the pilot about the reliability of the information corresponding to the output information for controlling the flight of the aircraft.

11. The system of claim 10 in which the first digital processing means comprises display symbol generating means for generating a display symbol that conveys to the pilot the information corresponding to the output information, and in which the first communicating means is operable to project the display symbol onto a monitor screen for the pilot to observe.

12. The system of claim 11 in which the first communicating means has programmed therein a reference location and projects the display symbol for the pilot to observe relative to the reference location, thereby to assist the pilot to control the flight of the aircraft by observing the position of the display symbol on the monitor screen relative to the reference location.

13. The system of claim 11 in which the second communicating means includes means for blanking the display symbol from display onto the monitor screen to provide the message.

14. In an information display system including processing means for receiving input information and for processing the input information in accordance with a first operational function to develop output information, and including display symbol generating means to provide for visual display of a symbol corresponding to the output information, a method for detecting a display symbol error, comprising:

developing display system information corresponding to the output information;

assigning an identifying tag to the display system information to mark the display symbol;

processing the output information in accordance with a second operational function to compute a derived version of the input information;

comparing the actual input information with the derived version of the input information to determine whether they differ within a preassigned operational tolerance;

acknowledging the existence of a display symbol error whenever the difference between the actual input information and the derived version of the input information exceeds the preassigned operational tolerance; and determining the display symbol in error by means of the identifying tag corresponding thereto.

15. The method of claim 14 in which the processing means comprises a digital-based processor.

16. The method of claim 14 which further comprises inhibiting a visual display of the display symbol in error.

17. The method of claim 14 in which the identifying tag is assigned to display system information within the display system generating means.

18. In an information processing system including means for providing input signal information to the system and digital processing means for processing the input signal information in accordance with a first predetermined operational function to provide output signal information, a processing error detection method comprising:

sensing the output signal information;

processing the output signal information by the digital processing means in accordance with a second predetermined operational function to provide a derived version of the input signal information, the first predetermined operational function being implemented in a first set of information processing algorithms, and the second predetermined operational function being implemented in a second set of information processing algorithms which differs from the first set of information processing algorithms; and comparing the derived version of the input signal information with the actual input signal information to determine whether they differ by more than a predetermined operational tolerance.

19. The method of claim 18 in which the second predetermined operational function represents an inverse function of the first predetermined operational function.

20. The method of claim 19 in which the input information defines an input vector and the output signal information defines a solution vector so that the first predetermined operational function defines a matrix of the transformation of the input vector into the solution vector, the second predetermined operational function defining the inverse matrix of the matrix of the transformation.

21. The method of claim 19 in which the digital processing means comprises first and second separate computational means, the output signal information being developed by the first computational menas and the derived version of the input signal information being developed by the second computational means.

22. The method of claim 18 which further comprises:

assigning a different identifying tag to each one of at least some of the output signal information, and applying the identifying tag to the ones of the output signal information prior to the computation of the inverse function, thereby to identify the derived version of the input signal information as that which corresponds to the actual input signal information which figured in the development of the output information having the same identifying tag.

23. In an information display system comprising processing means for processing display information, the processing means including a display symbol generating means for generating display symbol to convey the display information, a method for detecting display symbol errors comprising the steps of:

applying in the processing means an identifying tag to the display information to mark the display symbol;

determining in the processing means whether an error was introduced during the processing of the display information; and acknowledging with reference to the identifying tag the existence of an error, if any, in the display symbol corresponding to the display information.

24. The method of claim 23 in which the identifying tag is applied within the display symbol generating means.

25. The method of claim 23 in which the display system comprises a monitor screen and has programmed therein a monitor screen reference location, the display symbol conveying display information by its position on the monitor screen relative to the reference location.

26. In an information processing system including means for providing input signal information to the system and digital processing means for processing the input signal information in accordance with a first predetermined operational function to provide output signal information, a processing error detection method comprising:

sensing the output signal information;

processing the output signal information by the digital processing means in accordance with a second redetermined operational function to provide a derived version of the input signal information, the input signal information defining an input vector and the output signal information defining a solution vector so that the first predetermined operational function defines a matrix of the transformation of the input vector into the solution vector, and the second predetermined operational function representing an inverse function of the first predetermined operational function and defining the inverse matrix of the matrix of the transformation; and comparing the derived version of the input signal informatwon with the actual input signal information to determine whether they differ by more than a predetermined operational tolerance.

27. In an information processing system including means for providing input signal information to the system and digital processing means for processing the input signal information in accordance with a first predetermined operational function to provide output signal information, a processing error detection method comprising:

sensing the output signal information;

processing the output signal information by the digital processing means in accordance with a second predetermined operational function to provide a derived version of the the input signal information;

assigning a different identifying tag to each one of at least some of the output signal information prior to the computation of the derived version of the input signal information, thereby to identify the derived version of the input signal information as that which corresponds to the actual input signal information which figured in the development of the output information having the same identifying tag; and comparing the derived version of the input signal information with the actual input signal information to determine whether they differ by more than a predetermined operational tolerance.

* * * * *

UNITED STATES PATENT AND TRADEMARK OFFICE
CERTIFICATE OF CORRECTION

PATENT NO. : 4,698,785

DATED : October 6, 1987

INVENTOR(S) : John P. Desmond et al.

It is certified that error appears in the above-identified patent and that said Letters Patent is hereby corrected as shown below:

On the cover page, insert --Assignee: Flight Dynamics, Inc., Hillsboro, OR. --.

In column 2, line 52, "executed" should be --executed.--.

In column 13, line 2, "noncritcal" should be --noncritical--.

In column 17, lines 4-6, the equation

" $W' = -\tan(Y \text{ Position Coordinate} - \text{Reference Y Position Coordinate}) \times K_3$ "

should be

--$W' = -\tan(Y \text{ Position Coordinate} - \text{Reference Y Position Coordinate}) \times K_3$--.

In column 17, lines 19-25, the equations

" $XDOT(derived) = (B_{11} \times U' + B_{21} \times V' + B_{31} \times W') \times U$ $YDOT(derived) = (B_{12} \times U' + B_{22} \times V' + B_{32} \times W') \times U$ $ZDOT(derived) = (B_{13} \times U' + B_{23} \times V' + B_{33} \times W') \times U$ "

UNITED STATES PATENT AND TRADEMARK OFFICE
CERTIFICATE OF CORRECTION

PATENT NO. : 4,698,785

DATED : October 6, 1987

INVENTOR(S) : John P. Desmond et al.

It is certified that error appears in the above-identified patent and that said Letters Patent is hereby corrected as shown below:

should be

--XDOT(derived) = $(B_{11}$ x U' + $B_{21}$ x V' + $B_{31}$ x W') x U

YDOT(derived) = $(B_{12}$ x U' + $B_{22}$ x V' + $B_{32}$ x W') x U

ZDOT(derived) = $(B_{13}$ x U' + $B_{23}$ x V' + $B_{33}$ x W') x U--.

In column 18, line 26, "$K_6$is" should be --$K_6$ is--.

In column 19, lines 57-59, the equation

"Localizer Deviation(derived) = $SQRT(X_0^2 + Y_0^2)$- x $SIGN(X_0)$ x $K_4$."

should be

--Localizer Deviation(derived) = $SQRT(X_0^2 + Y_0^2)$ x $SIGN(X_0)$ x $K_4$,--.

UNITED STATES PATENT AND TRADEMARK OFFICE
CERTIFICATE OF CORRECTION

PATENT NO. : 4,698,785

DATED : October 6, 1987

INVENTOR(S) : John P. Desmond et al.

It is certified that error appears in the above-identified patent and that said Letters Patent is hereby corrected as shown below:

In column 20, line 3, "determined" should be --determine--; line 30, "thefirst" should be --the first--.

In column 23, line 66, "menas" should be --means--.

In column 24, line 14, "generating display symbol" should be --generating a display symbol--; line 45, "redetermined" should be --predetermined--; line 58, "informatwon" should be --information--.

Signed and Sealed this

Sixteenth Day of August, 1988

Attest:

DONALD J. QUIGG

Attesting Officer

Commissioner of Patents and Trademarks